United States Patent [19]

Hwo

[11] Patent Number: 4,766,178

[45] Date of Patent: Aug. 23, 1988

[54] BUTENE-RICH BUTENE-1 PROPYLENE COPOLYMER COMPOSITION

[75] Inventor: Charles C. Hwo, Sugarland, Tex.

[73] Assignee: Shell Oil Company, Houston, Tex.

[21] Appl. No.: 48,854

[22] Filed: May 12, 1987

Related U.S. Application Data

[63] Continuation of Ser. No. 801,343, Nov. 25, 1985, abandoned.

[51] Int. Cl.$^4$ .................. C08L 23/10; C08L 23/16; C08L 23/20; C08L 23/12
[52] U.S. Cl. ........................ 525/240; 526/348.1
[58] Field of Search ............................ 525/240

[56] References Cited

U.S. PATENT DOCUMENTS

| | | | |
|---|---|---|---|
| 3,634,552 | 1/1972 | Foglia et al. | 260/897 |
| 3,634,553 | 1/1972 | Foglia et al. | 260/897 |
| 3,754,063 | 8/1973 | Schimbor | 264/22 |
| 3,808,304 | 4/1974 | Schirmer | 525/240 |
| 3,832,274 | 8/1974 | Owston | 161/183 |
| 3,849,520 | 11/1974 | Bullard et al. | 260/897 |
| 3,891,008 | 6/1975 | D'Entremont | 138/146 |
| 3,900,534 | 8/1975 | Schard | 260/897 |
| 4,186,240 | 1/1980 | Matsuda et al. | 525/240 |
| 4,194,039 | 3/1980 | Mueller | 428/213 |
| 4,196,240 | 4/1980 | Lustig et al. | 428/35 |
| 4,207,363 | 6/1980 | Lustig et al. | 428/35 |
| 4,230,767 | 10/1980 | Isaka et al. | 428/349 |
| 4,379,883 | 4/1983 | Zecher | 524/801 |

FOREIGN PATENT DOCUMENTS 0145014 11/1984 European Pat. Off. .
0135358 3/1985 European Pat. Off. .

*Primary Examiner*—Carman J. Seccuro
*Attorney, Agent, or Firm*—Wendy K. B. Buskop

[57] ABSTRACT

A blend for producing a heat shrinkable oriented thermoplastic film which has good clarity and good processability, comprising a mixture containing:

from about 10% by weight to about 60% by weight butene-1 propylene copolymer, where the propylene comonomer content of said butene-1 propylene copolymer is from about 5 m % to about 40 m %; and from about 40% by weight to about 90% by weight propylene homopolymer or copolymer.

4 Claims, No Drawings

BUTENE-RICH BUTENE-1 PROPYLENE COPOLYMER COMPOSITION

This is a continuation of application Ser. No. 801,343, filed Nov. 25, 1985 and now abandoned.

BACKGROUND OF THE INVENTION

The present invention relates to blends of thermoplastic polymer materials which have improved properties. More particularly the present invention relates to blends of a propylene polymer with a butene-rich butene-1-propylene copolymer which may be fabricated into thermoplastic films and laminar structures which are heat shrinkable and which have good clarity and good processibility.

Thermoplastic blends for films are used as packaging material, and in the area of shrink packaging, for objects that are packaged in thermoplastic shrink film. Shrink film is used in many applications, for example, for many types of packaging and wrapping articles such as toys, sporting goods, stationary, greeting cards, hardware, household products, office supplies and forms, phonograph records, industrial parts, computer floppy diskettes, and photo albums, etc. Heat is applied to the film and the film shrinks to conform to the shape of the article packaged therein.

Many thermoplastic films shrink to some extent if they are subjected to elevated temperatures. Use is made of this characteristic by subjecting objects packaged in such films for a short time to elevated temperatures, e.g. exposing them to a blast of heated air, or by immersing in boiling water so that the film shrinks, thereby tightly enclosing the objects packaged therein. Examples are films fabricated from polyolefins or irradiated polyolefins.

Usually for most shrink film applications, a film should exhibit a high shrink energy or contractile force when exposed to elevated temperatures. In addition, the film should not only be heat shrinkable but have good clarity and be easily processed. Clarity is important in the marketing aspect of the packaged goods so that the consumer can ascertain what he or she is purchasing. Additional advantages of shrink packaging made from blends should include: (1) adds luster, enhances product appearance; (2) imparts contemporary image to the product; (3) helps the product sell itself; (4) keeps out dust and moisture so that the product doesn't become shop worn; (5) discourages shoplifters; (6) speeds production; (7) cuts labor and material costs; (8) reduces labeling cost; (9) easy for packaging operators to use; (10) simplifies internal handling; (11) wraps unusual shapes with a contour fit; (12) versatile—serves many packaging needs; and (13) excellent for bundling and multipackaging.

A shrink film should possess the following specific properties:

(1) the shrink force should be between 100 and 400 grams per inch at 100° C. depending on the objects to be encased.

(2) the percent shrinkage should be between 10 and 50% at 121° C. depending on the objects to be encased.

(3) the film should have high clarity or optics.

(4) the modulus should be between 60,000 and 350,000 psi depending upon the objects to be encased.

(5) machinability: the coefficient of friction should be less than 0.5.

(6) tear strength: the tear strength should be as high as possible; typical is 3 to 15 grams mil of film thickness and per inch of width.

(7) elongation: the elongation should be between 50 and 150% depending on the objects to be encased.

Films from the blends may be oriented or unoriented. Oriented films may be obtained by stretching processes in which tensions capable of stretching the film are applied to the film, the directions of which form an angle of about 90° utilizing well known prior art techniques. These film stretching tensions may be applied sequentially, as in the case for the film, after forming, is subjected to stretching in a longitudinal directions and thereafter tension is applied in a transverse direction to stretch the film transversely, or simultaneously, whereby longitudinal and transverse tensions are applied to the film at the same time resulting in a simultaneous longitudinal and transverse stretching of the film. Such processes are well known in the art and includes for example the "double-bubble" method which comprises extrusion of material into a tubular stalk film, cooling of the tubular stalk, reheating and inflating of the tube and simultaneously drawing the inflated tube in a longitudinal direction thereby imparting biaxial orientation to the film. Another common method for the biaxial orientation of the film sheet comprises passing the film sheet through a series of rotating draw rollers which impart longitudinal direction stretch to the film and subsequently transversely drawing the longitudinally stretched film, for example, by passing it through a tenter frame wherein the film is stretched in a transverse direction.

The film may be sealed around the product, formed into a bag, then subjected to heat and shrunk tightly around the product. A variety of equipment is available for shrink packaging from manual as well as automatic systems.

U.S. Pat. No. 3,900,534 discloses a biaxially oriented thermoplastic film structure formed from a blend comprising polypropylene and polybutene homopolymers where the polybutene is present in a small amount of more than 10% but less than 20% by weight.

U.S. Pat. No. 3,634,553 discloses a heat shrinkable oriented thermoplastic film which comprises a blend of polypropylene and an ethylene/butene-1 copolymer.

European Patent Application No. 0,145,014A discloses a blend of a random copolymer of propylene and an alpha olefin with 4 or more carbon atoms (i.e. perhaps butene-1), where the alpha olefin content in the copolymer is 8 to 30 mole% (m%).

Single layer shrink films based on blends of polybutylene with polypropylene are disclosed in Mobil Patents: U.S. Pat. No. 3,634,552 (1972), U.S. Pat. No. 3,634,553 (1972), U.S. Pat. No. 3,849,520 (1974), U.S. Pat. No. 3,900,534 (1975) and blends of polybutylene with ethylene vinyl acetate (EVA) and $C_2$-$C_\alpha$ elastomer or polybutylene with low density polyethylene (LDPE) and $C_2$-$C_\alpha$ elastomer (where $C_\alpha$ is an α-olefin comonomer) are disclosed in U.S. Pat. No. 4,379,883 (1983). Multilayers may include three layers (propylene-ethylene plus butene-1-ethylene plus ethylene-propylene rubber)/tie layer/linear low density polyethylene (LDPE) by Union Carbide, U.S. Pat. No. 4,196,240 (1980) for frozen poultry and U.S. Pat. No. 4,207,363 (1980) for primal meat cuts. Three layers of propylene-ethylene/(EVA+butene-1-ethylene)/propylene-ethylene, U.S. Pat. No. 4,194,039 (1980) is known. Also, three layers (polypropylene+polybutylene)/EVA/irradiated EVA by Cryovac, U.S. Pat. No. 3,754,063 (1973), U.S. Pat. No. 3,832,274 (1974), and U.S. Pat. No. 3,891,008 (1975) for turkey bags are known.

Heretofore, polyvinyl chloride (PVC) has been used to produce good shrink films. PVC has been shown to be much better in certain applications than other polyolefins such as propylene polymers. This is because the use of polyolefins in shrink wrap results in a moderate to high shrink force which is undesirable in many applications. However, the use of polyolefins allows for the use of high speed automated packaging machinery with ease of control, lower cost, and less deposit from corrosion of equipment, which results in less equipment maintenance than when using PVC. PVC, however, may produce a better looking package because of the low shrink force and better optics. Also, the seal and shrink may take place over a much broader temperature and tear strength may be better.

It has been desired to produce a blend for producing a heat shrinkable thermoplastic film with the film advantages of PVC but which is of low cost, can be used on a high speed automated packaging machine and which does not corrode equipment. It is the butene-rich butene-1 propylene polymer blend of the present invention which results in low shrink force which is adjustable by the blending ratio, low shrink temperature, low stiffness with better optics, and which does not corrode the equipment being used, is of lower cost and can be ussed on high speed automated packaging machines.

SUMMARY OF THE INVENTION

Applicant has surprisingly discovered a butene-rich butene-1 propylene copolymer where the propylene comonomer content of the butene-1-propylene copolymer is from about 5 m% to about 40 m% and thus the butene-1 content of the butene-1-propylene copolymer is from about 60 m% to about 95 m% which may be blended with a propylene polymer (homo- or copolymer) for producing a heat shrinkable oriented thermoplastic film which also has good clarity and good processability. Heretofore, no such butene-rich butene-1-propylene copolymers have been known which produce a heat shrinkable oriented thermoplastic film which has good clarity and good processability as well as not corroding equipment being used, which may be used as on high speed automated packaging machines.

The invention is a blend for producing a heat shrinkable oriented thermoplastic film which has good clarity and good processability, comprising a mixture containing:

from about 10% by weight to about 60% by weight butene-1 propylene copolymer, where the propylene comonomer content of said butene-1 propylene copolymer is from about 5 m% to about 40 m%; and from about 40% by weight to about 90% by weight propylene homopolymr or copolymer.

DETAILED DESCRIPTION OF THE INVENTION

The polymer and copolymer components of the film composition of the present invention are blended together to form a substantially homogeneous resin mixture. This may be accomplished, for example, by tumbling the mixture in a fiber drum. The tumbled mixture is then melt compounded by an extruder having good mixing screw and pelletized thereafter. The blend is then extruded into a film utilizing a standard extruder and tubular or flat film die and as subsequently oriented utilizing any one of a number of prior art film orientation techniques.

Various gauges of shrink film may be manufactured through utilizing a novel resin composition of the present invention. The gauge may generally vary from about 0.10 mil to about 5 mils and preferably from about 0.5 mil to about 2.0 mils depending to a great extent upon the type of shrink packaging applications for which the film is manufactured.

The following example as set forth to more clearly illustrate the present invention is not intended to limit the scope thereof.

EXAMPLE 1

A butene-1-propylene copolymer, C-2756, which contains 27 mole % (m%) of propylene comonomer was blended at a 15 weight % (w%) level with a Shell polypropylene random copolymer. This particular copolymer had an ethylene comonomer content of 1.0 wt%, however, the ethylene content may vary considerably. Applicant's blend was compared with (1) polypropylene random copolymer and with, (2) a blend of 15% of polybutylene (a butene-1-ethylene copolymer where the ethylene comonomer content was 0.75 wt% with 85% of the propylene random copolymer (1). This blend of butene-1-ethylene copolymer, where the ethylene comonomer content is 0.75 wt% is patented in Mobil U.S. Pat. No. 3,634,553 and is typical of compositions used heretofore. The polymers were blended utilizing a drum tumbler and subsequently fed into the hopper of the standard rotating screw extrusion apparatus which served to further mix and melt the blend, and then melt extruded and pelletized thereafter. The temperature of the melt within the extruder was maintained at about 465° F.

The blend was subsequently extruded in the shape of a tube from a tubular die affixed to the outlet of an extruder, the die being maintained at a temperature of 370° F. The tube was quenched to a temperature of about 60° F. which was substantially below the crystalline melting points of the propylene polymer and the butene-1 propylene copolymer immediately upon emergence from the die. The extruded tube had an external diameter of about 2 inches and a wall thickness of about 20 mils. Upon cooling, the tube was taken up by a set of draw rollers at about 12 ft/min and passed through a preheat oven where it was reheated. The temperature of the preheat oven was maintained at about 1000° F. The heated tube was immediately reinflated with air under pressure which expanded the heated tube by a ratio of about 5:1 in a transverse direction and a substantially similar ratio in the longitudinal direction. The expanded tube was subsequently collapsed by a pair of nip rollers operating at speeds higher than the rotational speeds of the draw rollers. The tube was passed to a set of windup rollers finally. Table 1 illustrates the properties which resulted from this experiment.

TABLE 1

| PROPERTIES OF SHRINK FILMS* | | |
|---|---|---|
| I<br>PP**<br>Control | II<br>PP + 15% C2756 | III<br>PP + 15%<br>PB8240 |
| Shrink @ 220° F., % | | |
| MD 4 | 7 | 5 |
| TD 8 | 10 | 10 |
| Shrink @ 250° F., % | | |
| MD 7 | 12.5 | 6.5 |
| TD 14 | 20 | 15.5 |

TABLE 1-continued
PROPERTIES OF SHRINK FILMS*

|  | I PP** Control | II PP + 15% C2756 | III PP + 15% PB8240 |
|---|---|---|---|
| Orientation Release Stress, psi | | | |
| MD | 360 | 250 | 354 |
| TD | 573 | 365 | 446 |
| Contractive Stress psi | | | |
| MD | 236 | 193 | 215 |
| TD | 213 | 138 | 108 |
| Haze, % | 1.9–3.6 | 2.9–3.9 | 5 |
| Tagent Modulus, psi | | | |
| MD | 303,700 | 222,760 | 247,860 |
| TD | 335,680 | 237,140 | 255,340 |
| Break Strength, psi | | | |
| MD | 19,384 | 16,220 | 18,478 |
| TD | 17,483 | 16,593 | 15,284 |
| Elongation, % | | | |
| MD | 61 | 78 | 53 |
| TD | 40 | 88 | 52 |
| Tear Strength, g/mil | | | |
| MD | 14 | 11.6 | 12.5 |
| TD | 13.7 | 13.6 | 11.9 |

*Tubular OPP Film @ 0.75 mil thickness
**A Random Copolymer @ 1.0 w % C2.

Table 1 considers a polypropylene control which is a random copolymer at 1.0 wt% ethylene (Control I), a blend of 85% polypropylene and 15% C-2756 which is applicant's invention with propylene comonomer content of the butene-1 propylene copolymer being 27 m% (Applicant II formulation), and a blend of polypropylene and 15% PB8240 which represents the Mobil U.S. Pat. No. 3,634,553 material of a butene-1-ethylene copolymer where the ethylene comonomer content is 0.75 wt% (Mobil III). The shrink forces both expressed by orientation release stress and contractive stress of applicant's film, II were lower than those of the Mobil III film and much lower than those of Control I film. These lower shrink forces are desirable and, thus, make the butene-1-propylene copolymer modified polyolefins (polypropylene) film useful in many shrink packaging application where low shrink force is required.

As may be seen from Table 1, Applicant II formulation resulted in somewhat higher percent shrinkage at 220° F. then the polypropylenne Control I and shrinkage percentage at least comparable to Mobil III. At a temperature of 250° F., the shrinkage percentage for Applicant II was higher than either Control I or Mobil III.

The modulus and break strength values of Applicant II formulation were quite acceptable. The haze or clarity value of Applicant II formulation was better than Mobil III and as good as Control I. The other properties such as tear strength and elongation are very acceptable, as well.

What is claimed:

1. A blend for producing a heat shrinkable, thermoplastic film which has good clarity and good processability, comprising a mixture containing:
   from about 10% by weight to about 60% by weight butene-1-propylene copolymer, where the propylene comonomer content of said butene-1-propylene copolymer is from about 27 m% to about 40 m%; and
   from about 40% by weight to about 90% by weight propylene homopolymer.

2. A blend for producing a heat shrinkable oriented thermoplastic film which has good clarity, good processability, comprising a mixture containing:
   from about 20% by weight to about 50% by weight butene-1-propylene copolymer, where the propylene comonomer content of said butene-1-propylene copolymer is from about 27 m% to about 30 m%; and
   from about 50% by weight to about 80% by weight propylene homopolymer.

3. A blend for producing a heat shrinkable oriented thermoplastic film which has good clarity and good processability comprising a mixture containing:
   about 35% by weight butene-1-propylene copolymer, where the propylene comonomer content of said butene-1-propylene copolymer is about 27 m%; and
   about 65% by weight propylene homopolymer.

4. A blend for producing a heat shrinkable thermoplastic film which has good clarity and good processability, consisting of a mixture of:
   15% by weight butene-1-propylene copolymer, wherein the propylene comonomer content of said butene-1-propylene copolymer is 27 m%; and
   85% by weight polyproyplene random copolymer wherein the ethylene comonomer content of said polypropylene is 1.0 w%.

* * * * *